United States Patent Office 3,640,930
Patented Feb. 8, 1972

3,640,930
PRODUCTION OF POLYVINYL CHLORIDE
SHAPED ARTICLES
Robert Buning, Oberlar, and Hans Raalf and Wolfgang
Pungs, Troisdorf, Germany, assignors to Dynamit Nobel
Aktiengesellschaft, Troisdorf, Bezirk-Cologne, Germany
No Drawing. Continuation of application Ser. No.
544,114, Apr. 21, 1966. This application Sept. 23,
1968, Ser. No. 772,445
Claims priority, application Germany, Apr. 24, 1965,
D 47,108
Int. Cl. C08f 21/04, 29/18
U.S. Cl. 260—23 XA                    2 Claims

ABSTRACT OF THE DISCLOSURE

A shaped article of post-chlorinated eutactic polyvinyl chloride which may or may not be admixed with a suitable plasticizer.

---

This application is a continuation of application Ser. No. 544,114, filed Apr. 21, 1966, and now abandoned.

This invention relates to the production of shaped articles of polyvinyl chloride. It more particularly refers to novel polyvinyl chloride shaped articles. It still more particularly refers to novel polyvinyl chloride shaped articles having improved physical properties.

Polyvinyl chloride is a well known plastic. It is known to produce shaped articles from both plasticized and unplasticized polyvinyl chloride. It is also known to post-chlorinate polyvinyl chloride and from this post-chlorinated material to produce shaped articles which have great dimensional stability. Where post-chlorinated polyvinyl chloride has been plasticized and the thus produced composition formed into a shaped article, the shaped article product will have greater or less flexibility depending upon the degree of plasticization, that is, depending upon the proportion of plasticizer in the product composition.

Polyvinyl chloride shaped articles, particularly where the polyvinyl chloride has been post-chlorinated and where the shaped article has plasticizer therein, have high dimensional stability under relatively high temperature conditions. However, the usual polyvinyl chloride shaped article is relatively easily deformable at relatively high temperatures accompanied by pressure.

It is therefore an object of this invention to provide a novel polyvinyl chloride shaped article.

It is another object of this invention to provide a plasticized novel polyvinyl chloride shaped article.

It is a further object of this invention to provide a post-chlorinated, plasticized polyvinyl chloride shaped article having improved physical properties.

Other and additional objects of this invention will become apparent from a consideration of this entire specification, including the claims appended hereto.

As used in this specification, deformation is measured by means of a Hoeppler consistometer operating at a pressure of 10 kg./cm.$^2$, on 1 hour load and 1 hour release, with a form factor of 0.5.

Conventional articles of plasticized, post-chlorinated polyvinyl chloride utilize as the polymeric constituent atactic polyvinyl chloride. It has now been found that if eutactic polyvinyl chloride (sterically ordered polyvinyl chloride) is used in the same manner and under the same conditions as previously obtained for atactic polyvinyl chloride shaped articles, a much improved product results. The eutactic polyvinyl chloride is characterized as having originally at least about 55% syndiotactic arrangement of chlorine atoms along the polymer chain and K values of about 50 to 90, preferably about 60 to 80.

Eutactic polyvinyl chloride can be post-chlorinated, for example according to Belgian Pat. 643,500, by chlorination of hydrochloric acid suspensions of eutactic polyvinyl chloride using chloroform as the swelling agent. Post-chlorination temperatures are suitably about 15 to 30° C.

It is practical in the practice of this invention to provide in the eutactic polyvinyl chloride composition about 20 to 60 percent by weight of a plasticizer based upon the total weight of the composition as well as to provide other suitable conventional constituent additives such as stabilizers, both light and heat, fillers, stiffening high polymers, processing adjuvants such as mold release agents, etc.

The useful plasticizers are the same materials as have been used or are known to be useful in the polyvinyl chloride art. Illustrative of such plasticizers are the various chain length monomeric, oligomeric and low polymeric esters such as medium and higher alcohol esters of various carboxylic acids including octyl, 2-ethyl hexyl, dodecyl, palmityl, etc., alcohol esters of phthalic, adipic, azelaic and/or sebacic acids. The polyester polymeric plasticizers include dimers, trimers and other low polymers of polybasic carboxylic acids and polyhydric alcohols; especially preferred are dibasic acids such as adipic and glycols such as ethylene, propylene, hexylene, dipropylene, etc., glycols. Esters of polyhydric alcohols such as pentaerythritol, sorbitol, mannitol, trimethylolpropane, trimethylolethane and the like with monobasic acids such as acetic, butyric, heptanoic, etc., are also quite useful. Non-carboxylic acid esters are known plasticizers for polyvinyl chloride. Exemplary of this group of compounds are tricresyl phosphate, trialkyl phosphates such as butyl or octyl, halogenated phosphates such as tris(chlorobromopropyl) phosphate and tris(dibromopropyl) phosphate. Other types of plasticizers include epoxidized vegetable oils such as soya, linseed, rapeseed, tall and the like.

It has been discovered that the use of eutactic rather than atactic polyvinyl chloride results in certain unexpected processing advantages. For example, it has been found that eutactic polyvinyl chloride has good ability to absorb plasticizer and that therefore it is possible to incorporate an appropriate amount of plasticizer into an eutactic polyvinyl chloride composition at a significantly lower temperature than that at which atactic polyvinyl chloride can be processed. Thus, plasticizer incorporation can be accomplished at about 160 to 240° C., preferably at about 175° C. as opposed to temperatures of up to about 240° C., which are required with atactic polyvinyl chloride.

Products prepared from eutactic polyvinyl chloride and from compositions containing this material have improved physical properties when compared to products similarly produced from atactic polyvinyl chloride. This is particularly true in the case of shaped articles produced from post-chlorinated eutactic polyvinyl chloride as compared with shaped articles produced from atactic polyvinyl chloride. For example, tensile strength of such articles increases total deformation decreases. Thus shaped articles in the form particularly of plates, sheets, tubes, pipes and other structural shapes made from eutactic polyvinyl chloride are superior to those similarly made from atactic polyvinyl chloride.

The following specific examples will serve to illustrate the practice of this invention but are in no way to be construed as limiting thereon. All parts and percentages are by weight unless expressly stated to be to the contrary.

EXAMPLE 1

60 parts of post-chlorinated eutactic polyvinyl chloride having a chlorine content of 65.3% and a K value of 69 and an equal amount post-chlorinated atactic polyvinyl chloride having a chlorine content of 67.4% and a K value of 68 were each identically formulated by mixing each with: 40 parts of diethylhexylphthalate, 2 parts of dibutyl tin mercaptide and 0.3 part of lubricant wax. Each mixture was then masticated at 175° C. on a roll. Part of the sheet obtained from the roll was thereupon stretched at the temperature of the roll on a calender into sheets of a thickness of 0.5 mm. and 1 mm., and part was pressed on a press into plates of 6 mm. and 10 mm. The values indicated in Table 1 were measured on one substantially identical set of these shaped bodies.

TABLE 1

|  | Post-chlorinated ||
| --- | --- | --- |
|  | Eutactic PVC | Atactic PVC |
| Shore hardness A (DIN 53,505) | 85 | 83 |
| Tensile strength, kg./cm.² (DIN 53,504) | 215 | 180 |
| Total deformation in percent of the initial height: |  |  |
| At 60° C | 36.6 | 54.8 |
| At 80° C | 45.0 | 65.4 |

EXAMPLE 2

68 parts of post-chlorinated eutactic polyvinyl chloride and an equal amount of post-chlorinated atactic polyvinyl chloride were formulated in accordance with Example 1, each respectively with 30 parts of tricresyl phosphate, 2 parts of epoxidized soya bean oil and 2 parts of barium-cadmium-laurate. Each mixture was then masticated on a roll at 175° C. The comminuted sheet obtained from the roll was then extruded on a screw extruder at a temperature of 180° C. at the screw head to form a tube having an inside diameter of 10 mm. and a wall thickness of 1 mm. The values set forth in Table 2 were measured on substantially identical tube samples with equivalent specimens being used for the determination of the deformation under pressure and the Shore hardness.

TABLE 2

|  | Post-chlorinated ||
| --- | --- | --- |
|  | Eutactic PVC | Atactic PVC |
| Shore hardness A (DIN 53,505) | 94 | 93 |
| Tensile strength, kg./cm.² (DIN 53,504) | 275 | 255 |
| Total deformation in percent of the initial height: |  |  |
| At 60° C | 39.3 | 54.1 |
| At 80° C | 47.4 | 64.4 |

EXAMPLE 3

65 parts of post-chlorinated eutactic polyvinyl chloride and an equal quantity of post-chlorinated atactic polyvinyl chloride were formulated in accordance with Example 1, each respectively with 22 parts of dodecylphthalate, 11 parts of benzylbutylphthalate, 2 parts of epoxidized soya bean oil and 2 parts of barium-cadmiumlaurate. Each mixture was then masticated on a roller at a temperature of 175° C. The sheet obtained was comminuted and then molded in an injection molding machine at a nozzle temperature of 200° C. to form a packing ring of a thickness of 2 mm. The values set forth in Table 3 were measured on substantially identical specimens punched out of the so obtained packing rings.

TABLE 3

|  | Post-chlorinated ||
| --- | --- | --- |
|  | Eutactic PVC | Atactic PVC |
| Shore hardness A (DIN 53,505) | 90 | 87 |
| Tensile strength, kg./cm.² (DIN 53,504) | 255 | 220 |
| Total deformation in percent of the initial height: |  |  |
| At 60° C | 35.6 | 55.2 |
| At 80° C | 43.8 | 64.7 |

We claim:
1. A shaped article comprising a post-chlorinated eutactic polyvinyl chloride having at least about 55% syndiotactic arrangement of chlorine substituents along the polymer chain and a K value of about 50 to 90 and about 20 to 60% by weight, based on the total weight of the composition, of a polyvinyl chloride plasticizer.
2. An article as claimed in claim 1, wherein said K value is about 60 to 80.

References Cited

UNITED STATES PATENTS 2,996,489   8/1961   Dannis et al. _____ 260—92.8 A
3,183,201   5/1965   Shimeha et al. _____ 260—31.2

FOREIGN PATENTS 643,500   5/1964   Belgium.

MORRIS LIEBMAN, Primary Examiner
H. H. FLETCHER, Assistant Examiner

U.S. Cl. X.R.
260—30.6 R, 31.6, 31.8 R, 92.8 AC